United States Patent [19]
Jang

[11] Patent Number: 5,699,950
[45] Date of Patent: Dec. 23, 1997

[54] ULTRASONIC VIBRATION WELDER

[75] Inventor: Deok hwan Jang, Suwon, Rep. of Korea

[73] Assignee: Samsung Electronics Co., Ltd, Suwon, Rep. of Korea

[21] Appl. No.: 554,913

[22] Filed: Nov. 9, 1995

[30] Foreign Application Priority Data

Nov. 9, 1994 [KR] Rep. of Korea ............. 94 29267

[51] Int. Cl.$^6$ ................................. B23K 21/02
[52] U.S. Cl. ........................... 228/1.1; 228/6.2
[58] Field of Search ................ 228/1.1, 4.5, 6.2

[56] References Cited

U.S. PATENT DOCUMENTS

| | | |
|---|---|---|
| 3,101,634 | 8/1963 | Cooper ............................ 228/1.1 |
| 3,780,926 | 12/1973 | Davis ............................. 228/1.1 |
| 4,208,001 | 6/1980 | Martner .......................... 228/1.1 |

*Primary Examiner*—Kenneth J. Ramsey
*Attorney, Agent, or Firm*—Burns, Doane, Swecker & Mathis LLP

[57] ABSTRACT

A welder using an ultrasonic vibration includes a vibration direction converter for diversely converting the direction of vibration generated by a vibrator according to the properties of a welded material, so that welding efficiency is improved. The vibration direction converter is made to be disassembled or assembled, so that the replacement of the rod is easy when it experiences vibration fatigue. Efficiency is maximized because plural welding operations can be made simultaneously, since plural vibration-transmitting directions due to a symmetrical multiple structure are possible by means of the vibration-direction converter.

40 Claims, 6 Drawing Sheets

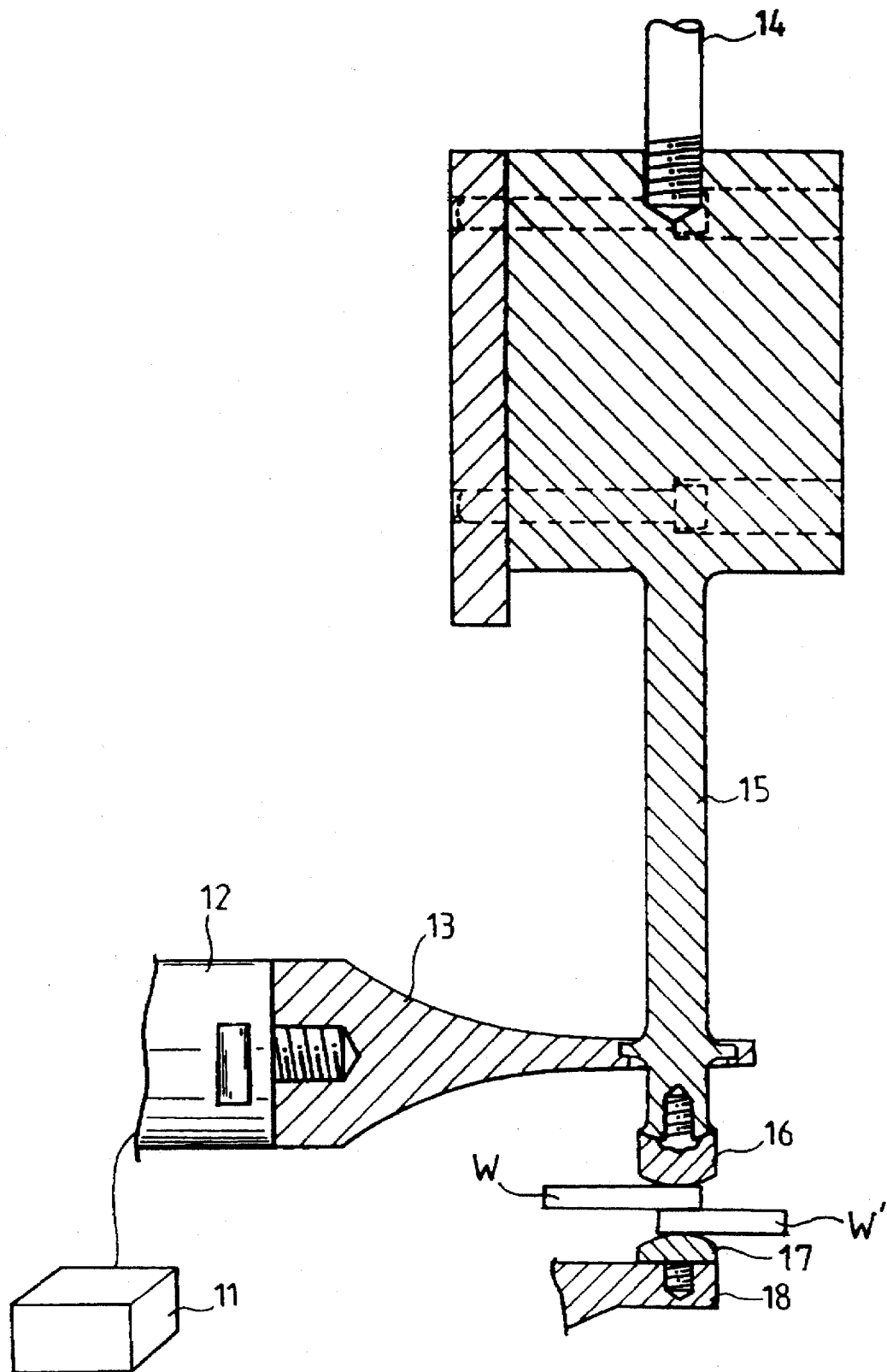
FIG._1
*(PRIOR ART)*

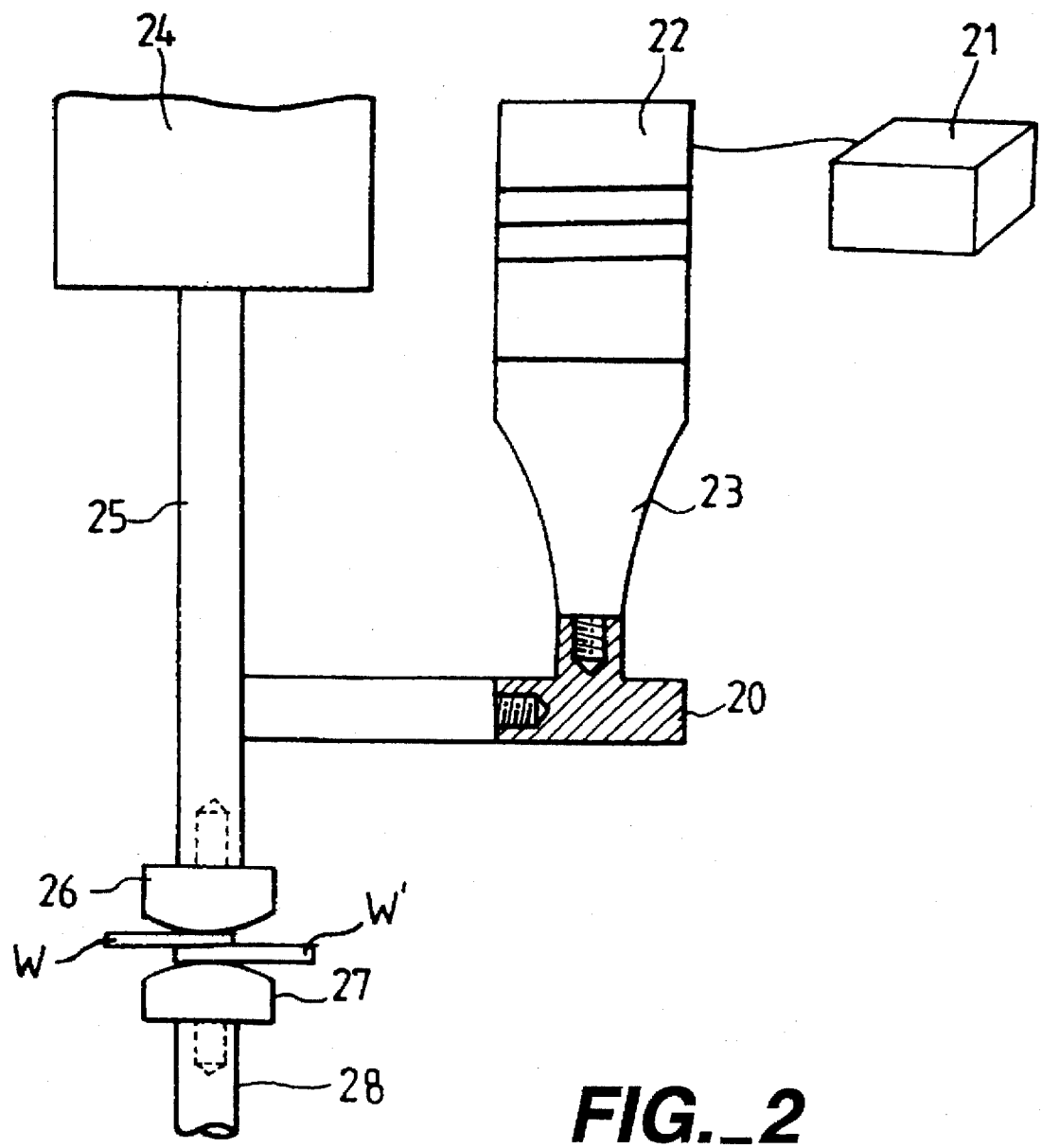
FIG._2

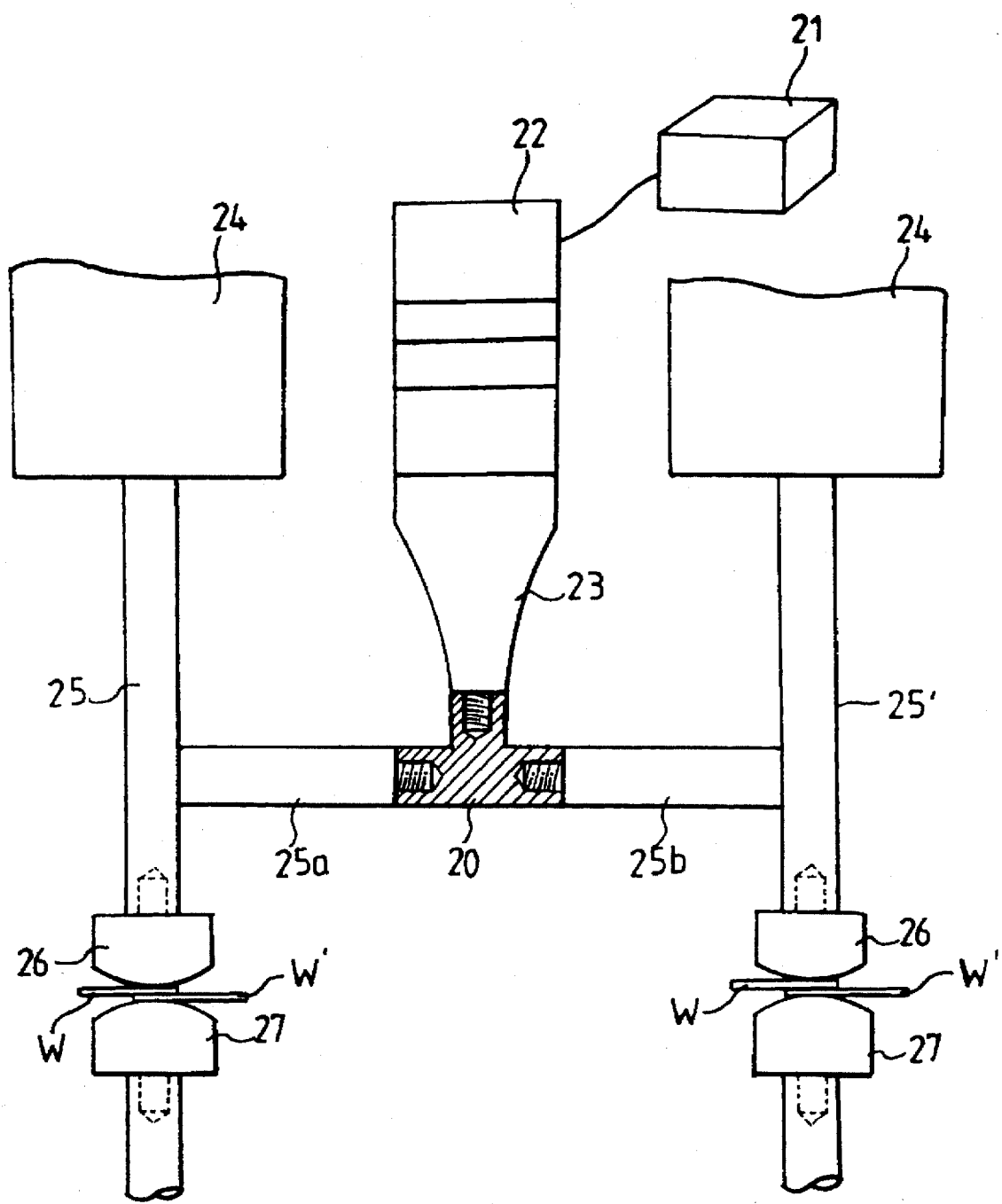
FIG._3

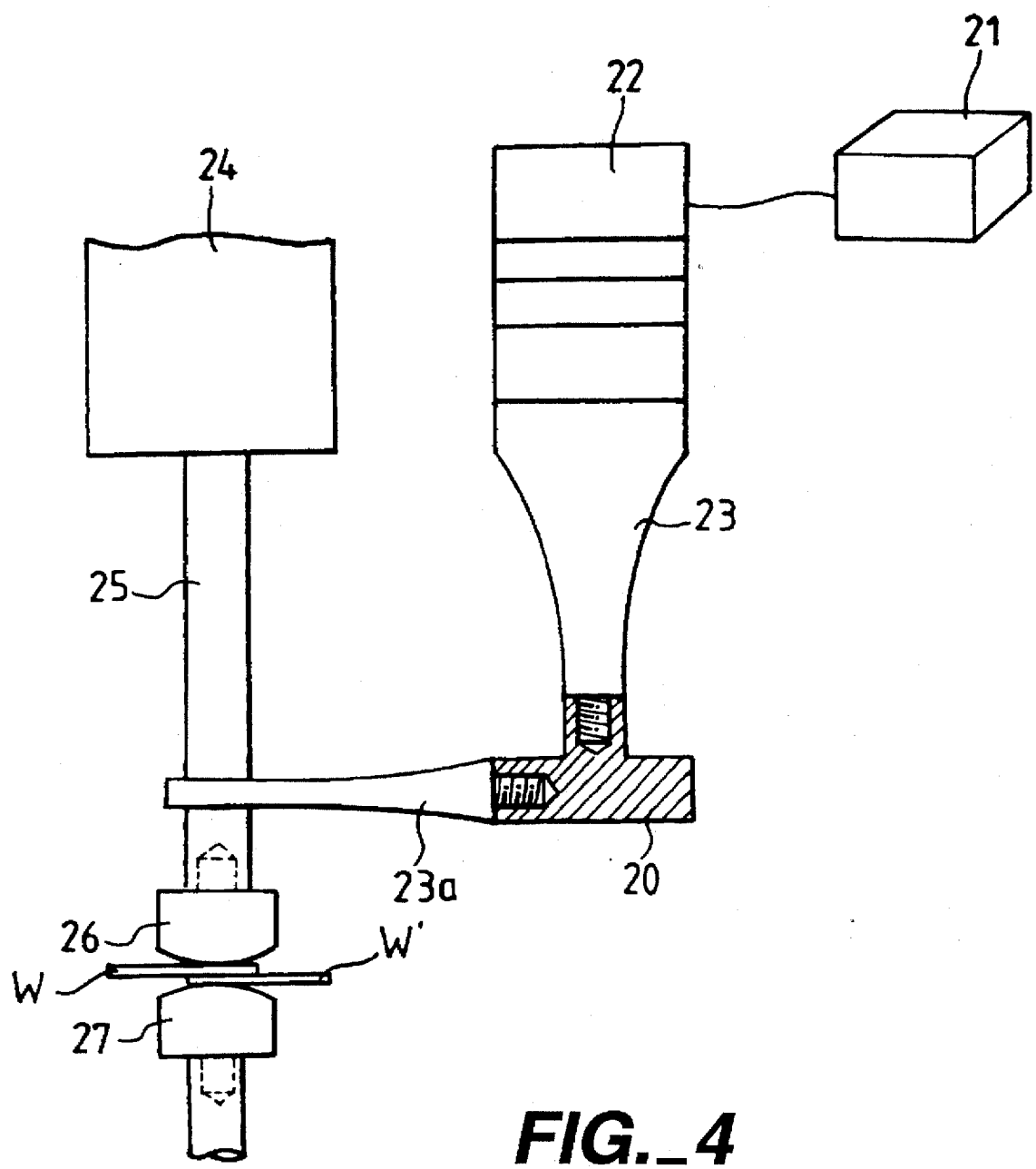
FIG._4

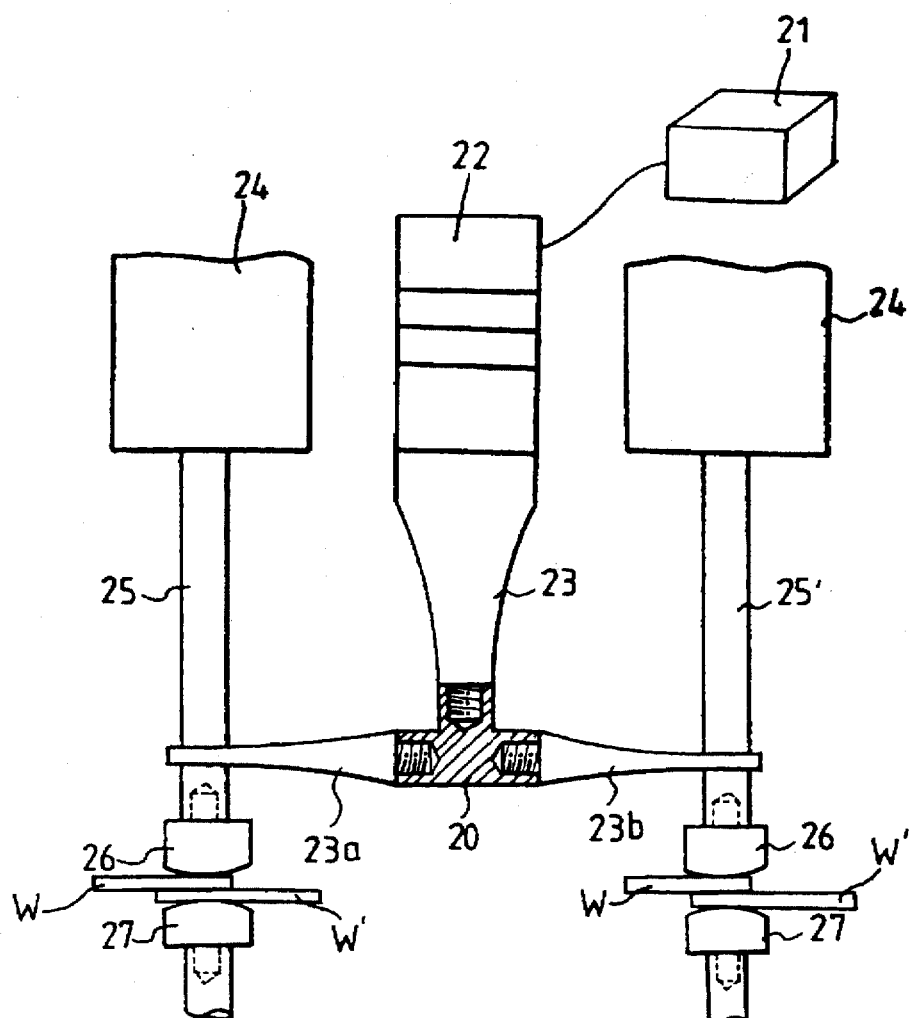
FIG._5
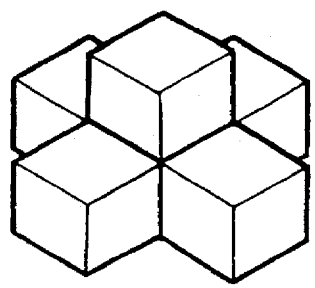
FIG._6

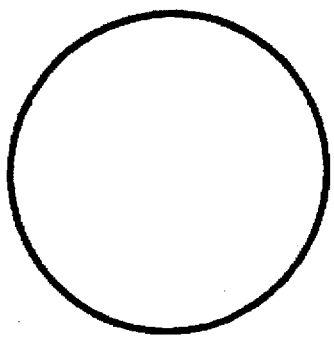
FIG._7A
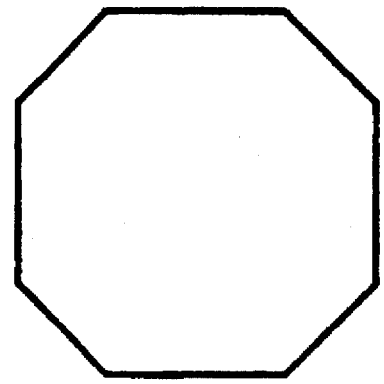
FIG._7B
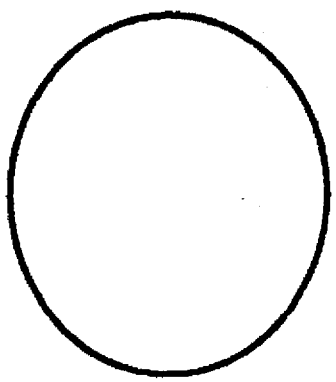
FIG._7C
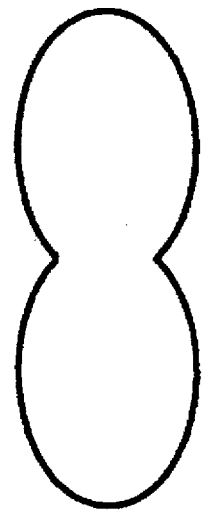
FIG._7D

1

ULTRASONIC VIBRATION WELDER

BACKGROUND OF THE INVENTION

The present invention relates to an ultrasonic vibration welder used for welding plastics or metals, and more particularly, to an ultrasonic vibration welder having a vibration-direction converting means for converting diversely the direction of the vibration generated by a vibrator according to the properties of a base material so as to improve the efficiency of welding.

An ultrasonic vibration welding is a welding method of performing a pressure-welding uisng an ultrasonic vibration generated by a vibrator. Usually, the ultrasonic vibration welding is applied to the partial melting and binding of a plastic or metal pipe, such as that used for water, gas or chemical conveyance, and may also be applied to other types of welding methods such as spot welding or seam welding. In this ultrasonic vibration welding, ultrasonic vibration characteristic, pressure, and welding duration are the important factors affecting the quality of the resulting weld.

FIG. 1 schematically illustrates a conventional welder for performing such an ultrasonic vibration welding (see U.S. Pat. No. 4,088,257), in which the configuration of the major parts are shown. Here, the welder is provided with an oscillator 11 for generating an electrical frequency, a vibrator 12 for converting the generated frequency into a mechanical vibration, and a funnel-shaped horn 13 for amplifying the vibration and being installed horizontally and coaxially with vibrator 12. On the front end of horn 13, a vibration-transmitting rod 15 which is linked to a press 14 by welding or brazing. Also, a tool tip 16 is fixed onto the lower end of vibration-transmitting rod 15, and an anvil 17 and an anvil supporter 18 for stably supporting anvil 17 are disposed to be opposite to tool tip 16. Between the ends of tool tip 16 and anvil 17, base materials W and W' are supported facing each other.

In the conventional the ultrasonic vibration welder having the above-described structure, oscillator 11 generates a predetermined electrical frequency which is then transmitted to vibrator 12. Here, vibrator 12 converts the transmitted electrical frequency into a mechanical vibration, and horn 13 installed at the end of vibrator 12 amplifies the transmitted mechanical vibration. The amount of amplification obtained by horn 13 can be determined by adjusting the slope of its funnel-shaped surface, to obtain a degree of vibration suitable for the welding property of the base material. In this manner, the amplified vibration is transmitted to vibration-transmitting rod 15.

Here, though the vibration is longitudinally transmitted from horn 13 to rod 15, the vibration of rod 15 is felt traversely by tool tip 16 and anvil 17 on which the base materials are placed.

Accordingly, when press 14 gives pressure to rod 15, a friction is generated between base materials W and W' disposed between tool tip 16 and anvil 17 by the aforesaid vibration. Thus, frictional heat is generated and the contact surfaces of the base materials are partially melted so as to be welded together.

To obtain a high mechanical vibration output in the above-described conventional welder, the difference between cross-sectional areas of both ends of the horn must be great, which means that the length or diameter of the horn must be enlarged. Hence, the apparatus becomes larger and more costly.

SUMMARY OF THE INVENTION

To solve the above problems, it is an object of the present invention to provide an ultrasonic vibration welder, by which welding efficiency is maximized, and simultaneously, to make the exchange of the rod easy.

Accordingly, to achieve the above object, there is provided a welder using an ultrasonic vibration comprising: an oscillator for oscillating an electric frequency; a vibrator for converting the frequency from the oscillator into a mechanical vibration; a vibration-amplifying member for amplifying the vibration generated by the vibrator over a predetermined amplitude; a vibration-transmitting member for receiving the amplified vibration from the vibration-amplifying member, a tool tip in contact with a first weld which is set up on the one end thereof and predetermined pressure apparatus which is connected to the other end thereof; a supporting member provided with an anvil for supporting a second weld which is in contact with the first weld at the corresponding position at which the first weld is in contact with the tool tip, and a vibration direction converter for converting the vibration direction from the vibration-amplifying member and for transmitting the vibration to the vibration-transmitting member. The vibration-transmitting member and the vibration-amplifying member are vertically positioned in parallel. The vibration direction converter is located between the bottom end of the vibration-transmitting member and the one end of the vibration-amplifying member.

In the welder using an ultrasonic vibration, it is preferable that between the vibration direction convertor and the vibration-transmitting member, a vibration-transmitting member is connected forming a double structure, and that between the vibration direction convertor and the vibration-transmitting member, more than two vibration-transmitting members are connected forming a multiple structure.

In the welder fusion using an ultrasonic vibration, it is preferable that by connecting two vibration-transmitting members to the vibration direction converter, respectively at opposite positions, two welding points are provided so that the whole apparatus forms a symmetrical structure centering around the vibration-amplifying member, wherein two simultaneous welding operations are made possible. By connecting even-numbered more than four vibration-transmitting members to the vibration direction converter, respectively at opposite positions, more than four even-numbered welding points are provided so that the whole apparatus forms a symmetrical structure centering around the vibration-amplifying member, wherein more than four simultaneous even-numbered welding operations are made possible.

In the welder using an ultrasonic vibration, it is preferable that between the vibration direction convertor and the vibration-transmitting member, a vibration-amplifying member is connected forming a double structure, and that between the vibration direction convertor and the vibration-transmitting member, more than two vibration-amplifying members are connected forming a multiple structure.

In the welder using an ultrasonic vibration, it is preferable that by connecting two vibration-amplifying members to the vibration direction converter, respectively at opposite positions, and connecting the vibration-transmitting members to the ends thereof, respectively, two welding points are provided so that the whole apparatus forms a symmetrical structure centering around the vibration-amplifying member, wherein two simultaneous welding operations are made possible. By connecting even-numbered more than four vibration-amplifying members to the vibration direction converter, respectively at opposite positions, and connecting the vibration-transmitting members to the ends thereof, respectively, more than four even-numbered welding points are provided so that the whole apparatus forms a symmetrical structure centering around the vibration-amplifying member, wherein more than four simultaneous even-numbered welding operations are made possible.

In the welder using an ultrasonic vibration, it is preferable that the vibration direction convertor is a flange forming a structure which can unite and disassemble the vibration-amplifying member and the vibration-transmitting member, that the vibration direction convertor is a flange forming a structure which can unite and disassemble in more than two directions the vibration-amplifying member and the vibration-transmitting member, that the cross-sectional shape of the vibration direction convertor is circular, rectangular, or hexagonal, and that the vibration-transmitting member is a bar of which the cross-sectional area is circular, polygonal oval or peanut-shaped, (FIGS. 7A–7D).

BRIEF DESCRIPTION OF THE DRAWINGS

The above objects and advantages of the present invention will become more apparent by describing in detail preferred embodiments thereof with reference to the attached drawings in which:

FIG. 1 is a schematic illustrating the configuration of the major parts in the conventional ultrasonic vibration welder;

FIG. 2 is a schematic illustrating the configuration of the major parts in an embodiment of an ultrasonic vibration welder according to the present invention;

FIG. 3 is a schematic illustrating the configuration of the major parts in another embodiment of an ultrasonic vibration welder according to the present invention;

FIG. 4 is a schematic illustrating the configuration of the major parts in still another embodiment of an ultrasonic vibration welder according to the present invention;

FIG. 5 is a schematic illustrating the configuration of the major parts in yet still another embodiment of an ultrasonic vibration welder according to the present invention; and FIG. 6 is a perspective view showing another example of a vibration-direction converter for use in an ultrasonic vibration welder according to the present invention.

FIGS. 7A–7D illustrate different embodiments of the cross-sectional shape of the vibration transmitting member.

DETAILED DESCRIPTION OF THE INVENTION

Referring to FIG. 2, an ultrasonic vibration welder according to an embodiment of the present invention will be explained.

The ultrasonic vibration welder includes an oscillator 21 for generating an electrical frequency, a vibrator 22 for converting the frequency from oscillator 21 into a mechanical vibration, and a vibration-amplifying horn 23 having a funnel portion provided on one end of vibrator 22, coaxially with respect thereto. Also, a vibration-transmitting rod 25 is provided in parallel with horn 23, having a tool tip 26 fixed to the lower end thereof and a press 24 installed on the upper end. An anvil 27 on which base materials W and W' is placed, is disposed opposite tool tip 26. An anvil supporter 28 is provided under anvil 27 so as to support anvil 27.

A vibration-direction converter 20 one end of which is connected to the lower end of horn 23 and the other end of which is connected to the side of rod 25, is provided. The converter 20 is of a "T" type so that two rods 25 can be united and disassembled in two directions. Also, vibration-direction converter 20 may have a shape shown in FIG. 6 so as to be combined with two or more rods 25. The vibration from horn 23 is direction-converted transmitted to rod 25 via vibration-direction converter 20. Here, the vibration-direction converter 20 may have a circular, rectangular or hexagonal cross-section.

In the ultrasonic vibration welder having the above structure according to one embodiment of the present invention, when oscillator 21 generates a predetermined electrical frequency, the frequency is transmitted to vibrator 22. Here, vibrator 22 converts the transmitted electrical frequency into a mechanical vibration. Vibration-amplifying horn 23 installed on the end of vibrator 22 amplifies the transmitted mechanical vibration. The amplified vibration is transmitted to rod 25 via vibration-direction converter 20 installed on the end of horn 23. At this time, the vibration longitudinally transmitted from horn 23 is direction-converted traversely via converter 20.

With the vibration transmission, press 24 applies pressure to rod 25 so that base materials W and W' disposed between tool tip 26 and anvil 27 are pressed to generate friction.

Thus, when base material W on tool tip 26 contacts base material W' supported on anvil 27 under the pressure of press 24, friction is generated between the two base materials so that the contact surfaces of the two base materials start to partly melt and become pressure-welded.

Referring to FIG. 3, in the ultrasonic vibration welder according to another embodiment of the present invention, plural vibration-transmitting members 25a and 25b are linked between vibration-direction converter 20 and vibration-transmitting rods 25 and 25'. Here, the members can be more than two so as to form a multiple structure.

Also, the welder may form a symmetrical structure centering around horn 23 by symmetically linking two vibration-transmitting members 25a and 25b with both ends of vibration-direction converter 20, and by linking each vibration-transmitting rods 25 and 25' at the end of the members. Such a structure enables two or more welding operations to occur at the same time since the apparatus actually has two welding points. Thus, the efficiency is increased and a simultaneous welding for different kinds of base materials is made possible.

On the other hand, if the vibration-direction converter is constructed as shown in FIG. 6, four or more welding works can be performed at the same time.

Referring to FIG. 4, as a still further embodiment of the ultrasonic vibration welder according to the present invention, a vibration-amplifying member 23a is linked between vibration-direction converter 20 and vibration-transmitting rod 25, and so the welder forms a double amplifying structure including first vibration amplifying member 23 and second vibration amplifying member 23a. Also, more than two vibration-amplifying members may be linked such that the apparatus can form a multiple amplifying structure.

Referring to FIG. 5, as a yet still another embodiment of the welder using an ultrasonic vibration according to the present invention, vibration-amplifying members 23a and 23b are respectively linked to vibration-direction converting means 20 at the opposite position, and vibration-transmitting rods 25 and 25' are linked to the end of each member 23a and 23b, so that the whole apparatus forms a symmetric structure cantering around vibration-amplifying horn 23, Thus, a structure having two fusion-welding points is produced, which can actually perform two welding operations at the same time. As described above, the welder of such structure also promotes the fusion-welding efficiency improvement, and the welding work with a weld and a base metal of different fusion properties can be possible at the same time.

As still yet a further embodiment of the welder using an ultrasonic vibration, even number of four or more vibration-amplifying rods are linked to a vibration-direction converter 20 at the opposite position, respectively, and a vibration-transmitting rod 25 is linked to the end of each rod. Thus, the structure of the apparatus is symmetrical centering around horn 23, and so the apparatus is improved to have more than four fusion-welding points so that more than four welding operations can be actually performed at the same time.

As described above, the welder using an ultrasonic vibration according to the present invention is equipped with the vibration-direction converting means for converting diversely the direction of the vibration generated from the vibrator according to the properties of a weld, so that the efficiency of welding using a vibration of great output can be improved.

In addition, because the horn and the rod in the vibration-direction converter is made to be capable of being disassembled or assembled, the exchange of the rod is made easier when a fatigue destruction from a vibration is brought to the rod. Particularly, it is an effect that the efficiency of the apparatus is maximized by the fact that plural welding operations can be performed simultaneously, because the various vibration-transmitting directions in the symmetrical multiple structure are made possible by means of the vibration-direction converting means.

What is claimed is:

1. A welder using an ultrasonic vibration, comprising:
   an oscillator for generating an electrical frequency;
   a vibrator for converting the generated frequency into a mechanical vibration;
   a vibration-amplifying member for amplifying the vibration generated by said vibrator over a predetermined amplitude;
   more than one vibration-transmitting member for receiving the amplified vibration from said vibration-amplifying member;
   pressure apparatus for applying pressure in one direction to said vibration-transmitting members;
   a tool tip provided on a first end of each of said vibration-transmitting members in a direction to which pressure is applied;
   an anvil provided to correspond to said tool tip;
   a supporting member for supporting said anvil, and
   a vibration direction convening means for converting the vibration direction from said vibration-amplifying member and transmitting the vibration to said vibration-transmitting members, said vibration direction converting means being located between a second end of said each vibration-transmitting member and one end of said vibration-amplifying member;
   wherein said vibration-transmitting members and said vibration-amplifying member are vertically positioned in parallel.

2. A welder using an ultrasonic vibration according to claim 1, comprising more than two vibration-transmitting members connected to said vibration direction converter wherein a multiple structure is formed.

3. A welder using an ultrasonic vibration according to claim 2, wherein said vibration direction converter is a flange forming a structure which can unite and disassemble said vibration-amplifying member and said vibration-transmitting members.

4. A welder using an ultrasonic vibration according to claim 2, wherein said vibration direction converter is a flange forming a structure which can unite and disassemble in more than two directions said vibration-amplifying member and said vibration-transmitting members.

5. A welder using an ultrasonic vibration according to claim 2, wherein the cross-sectional shape of said vibration direction converter is circular, rectangular or hexagonal.

6. A welder using an ultrasonic vibration according to claim 2, wherein said each vibration-transmitting member is a bar of which the cross-sectional area is circular, polygonal, oval or, peanut-shaped.

7. A welder using an ultrasonic vibration according to claim 1, wherein two vibration-transmitting members are connected to said vibration direction converter, respectively at opposite positions, so that two welding points are provided and so that the whole apparatus forms a symmetrical structure centering around said vibration-amplifying member and two simultaneous welding operations are made possible.

8. A welder using an ultrasonic vibration according to claim 7, wherein said vibration direction converter is a flange forming a structure which can unite and disassemble said vibration-amplifying member and said vibration-transmitting members.

9. A welder using an ultrasonic vibration according to claim 7, wherein said vibration direction converter is a flange forming a structure which can unite and disassemble in more than two directions said vibration-amplifying member and said vibration-transmitting members.

10. A welder using an ultrasonic vibration according to claim 7, wherein the cross-sectional shape of said vibration direction converter is circular, rectangular or hexagonal.

11. A welder using an ultrasonic vibration according to claim 7, wherein said each vibration-transmitting member is a bar of which the cross-sectional area is circular, polygonal, oval or, peanut-shaped.

12. A welder using an ultrasonic vibration according to claim 1, wherein, even-numbered more than four vibration-transmitting members are connected to said vibration direction converter, respectively at opposite positions, so that more than four even-numbered welding points are provided and so that the whole apparatus forms a symmetrical structure centering around said vibration-amplifying member and more than four simultaneous even-numbered welding operations are made possible.

13. A welder using an ultrasonic vibration according to claim 12, wherein said vibration direction converter is a flange forming a structure which can unite and disassemble said vibration-amplifying member and said vibration-transmitting members.

14. A welder using an ultrasonic vibration according to claim 12, wherein said vibration direction converter is a flange forming a structure which can unite and disassemble in more than two directions said vibration-amplifying member and said vibration-transmitting members.

15. A welder using an ultrasonic vibration according to claim 12, wherein the cross-sectional shape of said vibration direction converter is circular, rectangual or hexagonal.

16. A welder using an ultrasonic vibration according to claim 12, wherein said each vibration-transmitting member is a bar of which the cross-sectional area is circular, polygonal, oval or, peanut-shaped.

17. A welder using an ultrasonic vibration according to claim 1, wherein between said vibration direction converter and at least one of said vibration-transmitting members another vibration-amplifying member is connected forming a double amplifying structure.

18. A welder using an ultrasonic vibration according to claim 17, wherein said vibration direction converter is a flange forming a structure which can unite and disassemble said vibration-amplifying member and said vibration-transmitting members.

19. A welder using an ultrasonic vibration according to claim 17, wherein said vibration direction converter is a flange forming a structure which can unite and disassemble in more than two directions said vibration-amplifying member and said vibration-transmitting members.

20. A welder using an ultrasonic vibration according to claim 17, wherein the cross-sectional shape of said vibration direction converter is circular, rectangual or hexagonal.

21. A welder using an ultrasonic vibration according to claim 17, wherein said each vibration-transmitting member is a bar of which the cross-sectional area is circular, polygonal, oval or peanut-shaped.

22. A welder using an ultrasonic vibration according to claim 1, wherein between said vibration direction converter and said vibration-transmitting members more than two vibration-amplifying members is connected forming a multiple amplifying structure.

23. A welder using an ultrasonic vibration according to claim 22, wherein said vibration direction converter is a flange forming a structure which can unite and disassemble said vibration-amplifying member and said vibration-transmitting members.

24. A welder using an ultrasonic vibration according to claim 22, wherein said vibration direction converter is a flange forming a structure which can unite and disassemble in more than two directions said vibration-amplifying member and said vibration-transmitting members.

25. A welder using an ultrasonic vibration according to claim 22, wherein the cross-sectional shape of said vibration direction converter is circular, rectangual or hexagonal.

26. A welder using an ultrasonic vibration according to claim 22, wherein said each vibration-transmitting member is a bar of which the cross-sectional area is circular, polygonal, oval or, peanut-shaped.

27. A welder using an ultrasonic vibration according to claim 1, wherein two vibration-amplifying members are connected to said vibration direction converter, respectively at opposite positions, and said vibration-transmitting members are connected to ends thereof of said two vibration amplifying members, respectively, so that two welding points are provided and so that the whole apparatus forms a symmetrical structure centering around said vibration-amplifying member and two simultaneous welding operations are made possible.

28. A welder using an ultrasonic vibration according to claim 27, wherein said vibration direction converter is a flange forming a structure which can unite and disassemble said vibration-amplifying member and said vibration-transmitting members.

29. A welder using an ultrasonic vibration according to claim 27, wherein said vibration direction converter is a flange forming a structure which can unite and disassemble in more than two directions said vibration-amplifying member and said vibration-transmitting members.

30. A welder using an ultrasonic vibration according to claim 27, wherein the cross-sectional shape of said vibration direction converter is circular, rectangual or hexagonal.

31. A welder using an ultrasonic vibration according to claim 27, wherein said each vibration-transmitting member is a bar of which the cross-sectional area is circular, polygonal, oval or, peanut-shaped.

32. A welder using an ultrasonic vibration according to claim 1, wherein even-numbered more than four vibration-amplifying members are connected to said vibration direction converter, respectively at opposite positions, and said vibration-transmitting members are connected to ends thereof of said more than four vibration amplifying members, respectively, so that more than four welding points are provided and so that the whole apparatus forms a symmetrical structure centering around said vibration-amplifying member and more than four simultaneous even-numbered welding operations are made possible.

33. A welder using an ultrasonic vibration according to claim 32, wherein said vibration direction converter is a flange forming a structure which can unite and disassemble said vibration-amplifying member and said vibration-transmitting members.

34. A welder using an ultrasonic vibration according to claim 32, wherein said vibration direction converter is a flange forming a structure which can unite and disassemble in more than two directions said vibration-amplifying member and said vibration-transmitting members.

35. A welder using an ultrasonic vibration according to claim 32, wherein the cross-sectional shape of said vibration direction converter is circular, rectangual or hexagonal.

36. A welder using an ultrasonic vibration according to claim 32, wherein said each vibration-transmitting member is a bar of which the cross-sectional area is circular, polygonal, oval or, peanut-shaped.

37. A welder using an ultrasonic vibration according to claim 1, wherein said vibration direction converter is a flange forming a structure which can unite and disassemble said vibration-amplifying member and said vibration-transmitting members.

38. A welder using an ultrasonic vibration according to claim 1, wherein the cross-sectional shape of said vibration direction converter is circular, rectangular or hexagonal.

39. A welder using an ultrasonic vibration according to claim 1, wherein said each vibration-transmitting member is a bar of which the cross-sectional area is circular, polygonal, oval or, peanut-shaped.

40. A welder using an ultrasonic vibration according to claim 1, wherein said vibration direction converter is a flange forming a structure which can unite and disassemble in more than two directions said vibration-amplifying member and said vibration-transmitting members.

* * * * *